(12) United States Patent
Chiang et al.

(10) Patent No.: US 10,713,463 B2
(45) Date of Patent: Jul. 14, 2020

(54) DISPLAY METHOD OF USER INTERFACE AND ELECTRONIC APPARATUS THEREOF

(71) Applicant: Egis Technology Inc., Taipei (TW)

(72) Inventors: Yuan-Lin Chiang, Taipei (TW); Jun-Chao Lu, Taipei (TW); Hsien-Jen Hsu, Taipei (TW)

(73) Assignee: Egis Technology Inc., Taipei (TW)

( * ) Notice: Subject to any disclaimer, the term of this patent is extended or adjusted under 35 U.S.C. 154(b) by 128 days.

(21) Appl. No.: 16/105,987

(22) Filed: Aug. 21, 2018

(65) Prior Publication Data

US 2019/0114461 A1 Apr. 18, 2019

Related U.S. Application Data

(60) Provisional application No. 62/573,140, filed on Oct. 16, 2017, provisional application No. 62/598,480, filed on Dec. 14, 2017.

(30) Foreign Application Priority Data

Apr. 18, 2018 (CN) .......................... 2018 1 0349409

(51) Int. Cl.
*G06K 9/00* (2006.01)
(52) U.S. Cl.
CPC ..... *G06K 9/00026* (2013.01); *G06K 9/00067* (2013.01); *G06K 9/00912* (2013.01)
(58) Field of Classification Search
USPC ................................................ 382/124–125
See application file for complete search history.

(56) References Cited

U.S. PATENT DOCUMENTS

| 8,204,281 | B2 | 6/2012 | Satyan et al. |
| 9,898,642 | B2 | 2/2018 | Han et al. |
| 2003/0123715 | A1 | 7/2003 | Uchida |

(Continued)

FOREIGN PATENT DOCUMENTS

| CN | 1668244 | 9/2005 |
| CN | 1924889 | 3/2007 |

(Continued)

OTHER PUBLICATIONS

"International Search Report of China Counterpart Application", dated Jan. 4, 2019, p. 1-p. 9.

(Continued)

*Primary Examiner* — Leon Viet Q Nguyen
(74) *Attorney, Agent, or Firm* — JCIPRNET

(57) ABSTRACT

A display method of user interface and an electronic apparatus using the same are provided. The display method of user interface is applied to fingerprint registration, and includes: sensing an object and obtaining a swiping image of the object; analyzing the swiping image to obtain a plurality of feature points of the swiping image;
generating a pre-registration dataset according to the feature points, and analyzing the pre-registration dataset to obtain an image adjusting parameter; and displaying a user interface, and adjusting a range of a filled region of a reference image on the user interface according to the image adjusting parameter. Therefore, the user learns a real-time information of fingerprint registration progress when the user performs fingerprint registration in a swiping manner.

20 Claims, 13 Drawing Sheets

(56) References Cited

U.S. PATENT DOCUMENTS

| | | | | |
|---|---|---|---|---|
| 2013/0108125 A1* | 5/2013 | Storm | ................ | G06K 9/00026 |
| | | | | 382/124 |
| 2015/0146945 A1 | 5/2015 | Han et al. | | |
| 2015/0254446 A1 | 9/2015 | LaCous et al. | | |
| 2016/0321494 A1* | 11/2016 | Shin | ................... | G06K 9/00013 |
| 2017/0103253 A1* | 4/2017 | Pyun | ................. | G06K 9/00026 |

FOREIGN PATENT DOCUMENTS

| | | |
|---|---|---|
| CN | 102446271 | 5/2012 |
| CN | 103198289 | 7/2013 |
| CN | 105373786 | 3/2016 |
| CN | 105814586 | 7/2016 |
| CN | 105981046 | 9/2016 |
| CN | 105989349 | 10/2016 |
| CN | 106056037 | 10/2016 |
| CN | 106485190 | 3/2017 |
| CN | 107004131 | 8/2017 |
| JP | 2000293253 | 10/2000 |
| TW | 1530884 | 4/2016 |

OTHER PUBLICATIONS

"Office Action of China Counterpart Application," dated Jan. 19, 2020, p. 1-p. 9.

\* cited by examiner

DISPLAY METHOD OF USER INTERFACE AND ELECTRONIC APPARATUS THEREOF

CROSS-REFERENCE TO RELATED APPLICATION

This application claims the priority benefits of U.S. provisional application Ser. No. 62/573,140, filed on Oct. 16, 2017, U.S. provisional application Ser. No. 62/598,480, filed on Dec. 14, 2017, and China application serial no. 201810349409.2, filed on Apr. 18, 2018. The entirety of each of the above-mentioned patent applications is hereby incorporated by reference herein and made a part of specification.

BACKGROUND OF THE INVENTION

Field of the Invention

The invention relates to a user interface display technique, and particularly relates to a display method of user interface applied to fingerprint registration and an electronic apparatus using the display method.

Description of Related Art

In recent years, fingerprint recognition technique has been widely used in various electronic devices to provide various functions such as identity login or identity verification. However, in the general fingerprint recognition technique, a user presses a finger on a fingerprint sensor to register a fingerprint in a manner of one-time press or multiple presses, and a corresponding user interface is provided to inform the user with the progress of fingerprint registration. For example, if the fingerprint registration is performed through the manner of multiple presses, each time when the user presses the finger, an area of a corresponding fingerprint image representing the obtained fingerprint information displayed on the user interface is increased correspondingly. After a sufficient amount of the fingerprint information is obtained, the fingerprint registration is completed.

However, if the user performs the fingerprint registration through the manner of swiping a finger, the conventional fingerprint recognition technique does not correspondingly display a fingerprint image on the user interface to inform the user with the progress of the fingerprint registration according to the swiping progress of the user's finger. Namely, during the process of fingerprint registration through swiping a finger, the user cannot learn the progress of the fingerprint registration in real-time.

SUMMARY OF THE INVENTION

The invention is directed to a display method of user interface and an electronic apparatus using the display method. By applying the invention, a user is capable of learning a real-time fingerprint registration progress through a display of the electronic apparatus during a process of fingerprint registration performed by swiping a finger.

The invention provides a display method of user interface applied to fingerprint registration. The display method includes: obtaining a swiping image by a fingerprint sensor; analyzing the swiping image to obtain a plurality of feature points of the swiping image; determining whether the swiping image is a first swiping image; if the swiping image is the first swiping image, generating a pre-registration dataset according to the feature points of the swiping image, and analyzing the pre-registration dataset to obtain a basic image parameter; and displaying a filled region of a reference image on the user interface according to the basic image parameter.

The invention provides a display method of user interface applied to fingerprint registration. The display method includes: obtaining a swiping image by a fingerprint sensor; analyzing the swiping image to obtain a plurality of feature points of the swiping image, and obtain a coordinate parameter of the feature point located at the most upper left corner of the swiping image; determining whether the swiping image is a first swiping image; if the swiping image is the first swiping image, generating a pre-registration dataset according to the feature points of the swiping image; and displaying a filled region of a reference image on the user interface according to the coordinate parameter and an area of the swiping image.

The invention provides an electronic apparatus comprising a fingerprint sensor, a processor and a display. The fingerprint sensor is configured to obtain a swiping image. The processor is coupled to the fingerprint sensor. The processor analyzes the swiping image to obtain a plurality of feature points of the swiping image, and determines whether the swiping image is a first swiping image. The display is coupled to the processor. If the processor determines that the swiping image is the first swiping image, the processor generates a pre-registration dataset according to the feature points of the swiping image and analyzes the pre-registration dataset to obtain a basic image parameter. The processor, through the display, displays a filled region of a reference image on a user interface according to the basic image parameter.

The invention provides an electronic apparatus comprising a fingerprint sensor, a processor and a display. The fingerprint sensor is configured to obtain a swiping image. The processor is coupled to the fingerprint sensor. The processor analyzes the swiping image to obtain a plurality of feature points of the swiping image and obtain a coordinate parameter of the feature point located at the most upper left corner of the swiping image. The processor determines whether the swiping image is a first swiping image. The display is coupled to the processor. If the processor determines that the swiping image is the first swiping image, the processor generates a pre-registration dataset according to the feature points of the swiping image. The processor displays a filled region of a reference image on a user interface according to the coordinate parameter and an area of the swiping image.

According to the above description, the display method of user interface and the electronic apparatus using the display method are applied to obtain a corresponding image adjusting parameter by analyzing each of a plurality of swiping images in sequence obtained during the process of fingerprint registration, and are applied to display a corresponding filled region of the reference image on the user interface according to the image adjusting parameter, so as to provide the user with real-time information on the progress of fingerprint registration.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
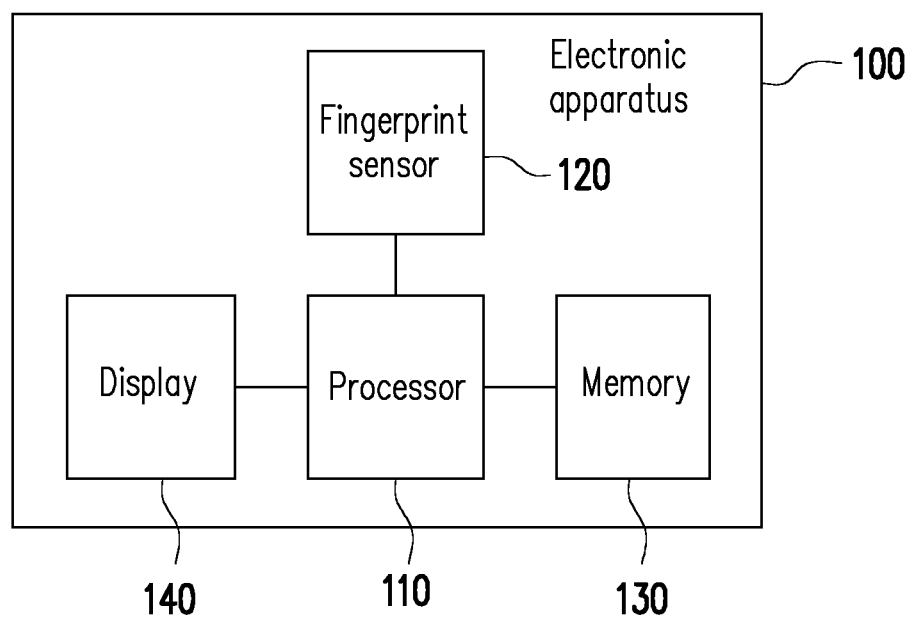
FIG. 1 is a schematic diagram of an electronic apparatus according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a schematic diagram of an electronic apparatus according to an embodiment of the invention. Referring to FIG. 1, the electronic apparatus 100 includes a processor 110, a fingerprint sensor 120, a memory 130 and a display 140. The processor 110 is coupled to the fingerprint sensor 120, the memory 130 and the display 140. The electronic device 100 is, for example, an electronic product such as a smart phone, a notebook (NB), a tablet Personal Computer (PC), etc. In the embodiment, the electronic apparatus 100 executes a fingerprint sensing operation through the fingerprint sensor 120 to obtain a fingerprint image of a user's finger. In the embodiment, when the user places a finger on the fingerprint sensor 120 to perform a swiping operation, the fingerprint sensor 120 performs fingerprint sensing. The fingerprint sensor 120 may obtain a plurality of swiping images in sequence and provide them to the processor 110. The processor 110 may analyze these swiping images to obtain a plurality of feature points from each of the swiping images. The feature points are fingerprint feature points of the user's finger. Thereafter, the processor 110 generates fingerprint registration dataset according to the feature points.

In the embodiments, the fingerprint sensor 120 obtains the swiping images one-by-one, and the processor 110 analyzes the swiping images one-by-one. The processor 110 may correspondingly change a filled region of a reference image on a User Interface (UI) displayed on the display 140 according to the analysis result of each of the swiping images obtained one-by-one. The filled region of the reference image is used for representing a range which the obtained fingerprint information covers, and the area of the filled region of the reference image is progressively increased and changed corresponding to the progress of a finger swiping by a user (i.e. corresponding to the amount of the obtained fingerprint information). Therefore, during the process of fingerprint registration, the electronic apparatus 100 of the invention may provide the user with information on real-time progress of fingerprint registration.

In the embodiments of the invention, the processor 110 is, for example, a Central Processing Unit (CPU), a System on Chip (SoC) or other programmable general purpose or special purpose microprocessor, a Digital Signal Processor (DSP), a programmable controller, an Application Specific Integrated Circuits (ASIC), a Programmable Logic Device (PLD), other similar processing device or a combination of these devices.

In the embodiments of the invention, the fingerprint sensor 120 may be, for example, a capacitive fingerprint sensor or an optical fingerprint sensor, and the type of the fingerprint sensor 120 is not limited in the invention. In the embodiments of the invention, a fingerprint sensing mechanism of the fingerprint sensor 120 may be swiping sensing or pressing sensing. It should be noted that in the embodiments of the invention, the fingerprint registration is implemented through swiping sensing. Namely, during the process of fingerprint registration, the user swipes the finger on a sensing surface of the fingerprint sensor 120, and the fingerprint sensor 120 senses and obtains fingerprint information of the user through the sensing surface. For example, the electronic apparatus 100 is designed to perform fingerprint registration by asking a user to swipe a finger on the fingerprint sensor 120. In other words, the fingerprint sensor 120 may perform the fingerprint sensing in the manner of swiping sensing. For fingerprint authentication, the user is asked to press the finger on the fingerprint sensor 120. Namely, for fingerprint authentication, the fingerprint sensor 120 performs the fingerprint sensing in the manner of pressing sensing.

In the embodiments of the invention, the memory 130 is configured to store fingerprint data and related applications for the processor 110 to read and execute.

In the embodiments of the invention, the display 140 may be, for example, a Liquid Crystal Display (LCD), a Light Emitting Diode (LED) display, a Micro LED display or an Organic LED display, etc., and the type of the display 140 is not limited in the invention. In the embodiments of the invention, when the user performs the fingerprint registration, the display 140 displays the corresponding UI and the UI includes a reference image simulating a fingerprint. During the process where the user swipes the finger on the fingerprint sensor 120, a range of the filled region of the reference image displayed on the display 140 is increased corresponding to the gradual increase of the fingerprint data sensed by the fingerprint sensor 120.

Figure 2:
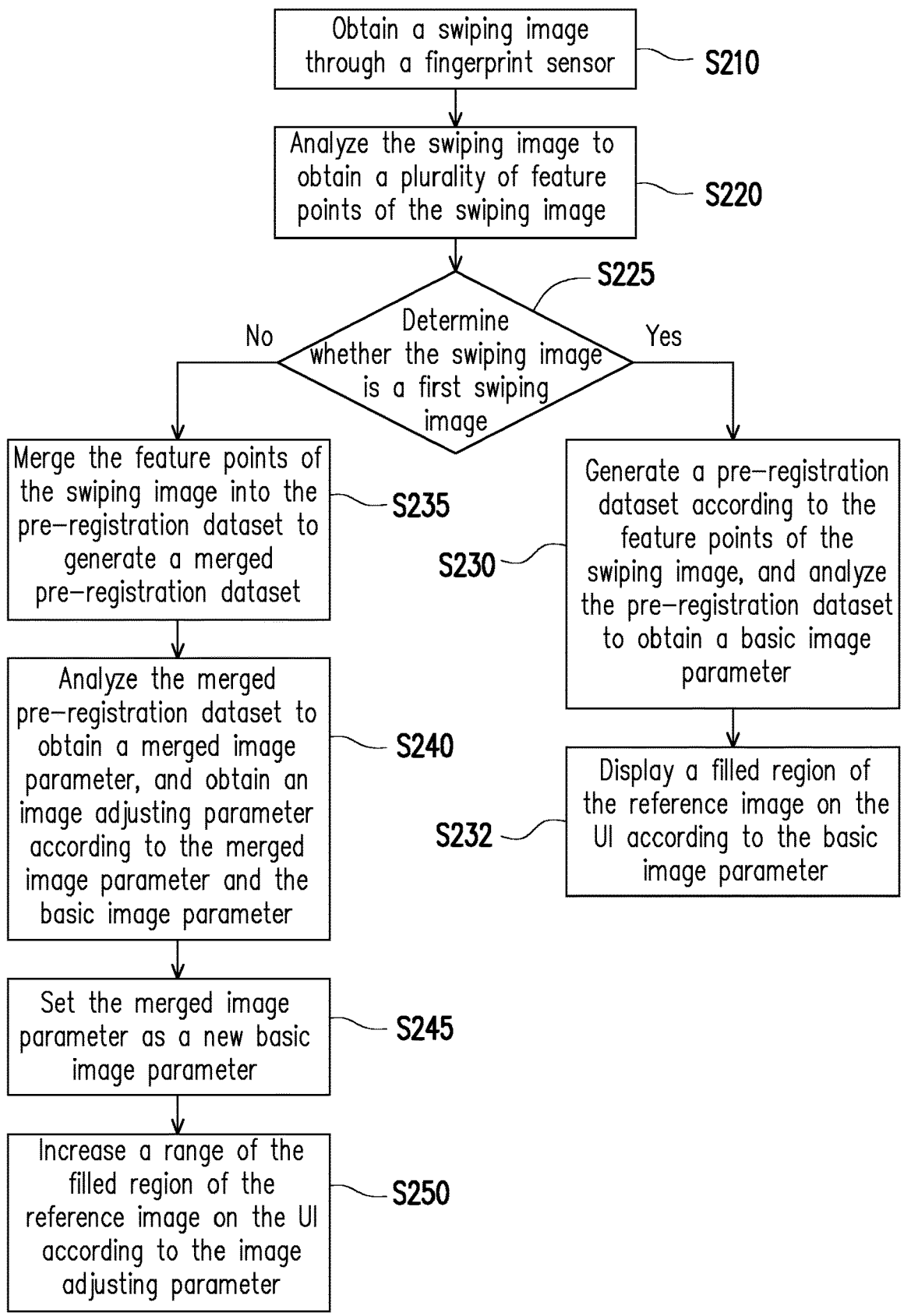
FIG. 2 is a flowchart illustrating a fingerprint registration method according to an embodiment of the invention.

FIG. 2 is a flowchart illustrating a fingerprint registration method according to an embodiment of the invention. Referring to FIG. 1 and FIG. 2, the fingerprint registration method of the embodiment is applied to the electronic apparatus 100 of FIG. 1. When the user swipes the finger on the fingerprint sensor 120 for fingerprint registration, the fingerprint sensor 120 of the electronic apparatus 100 senses and obtains a plurality of swiping images of an object (i.e. the user's finger) in sequence. Take one of the swiping images as an example. In step S210, the fingerprint sensor 120 obtains a swiping image. In step S220, the processor 110 analyzes the swiping image to obtain a plurality of feature points of the swiping image. In step S225, the processor 110 determines whether the swiping image is a first swiping image. If yes, step S230 is executed. In step S230, the processor 110 generates a pre-registration dataset according to the feature points of the swiping image, and analyzes the pre-registration dataset to obtain a basic image parameter (h). In step S232, the processor 110 displays a filled region of the reference image on the UI according to the basic image parameter (h).

If the swiping image is not the first swiping image, step S235 is executed. In step S235, the processor 110 merges the feature points of the swiping image into the pre-registration dataset to generate a merged pre-registration dataset. In step S240, the processor 110 analyzes the merged pre-registration dataset to obtain a merged image parameter (H), and obtains an image adjusting parameter (Step=H−h) according to the merged image parameter (H) and the basic image parameter (h). The image adjusting parameter (Step) is equal to the merged image parameter (H) minus the basic image parameter (h). In step S245, the processor 110 sets the merged image parameter (H) as a new basic image parameter (h). In step 250, the processor 110 increases a range of the filled region of the reference image on the UI according to the image adjusting parameter (Step), i.e. to increase a length of the filled region. In order to further convey technical details of a display method of user interface and the fingerprint registration to those skilled in the art, several embodiments are provided below for further description.

Figure 3:
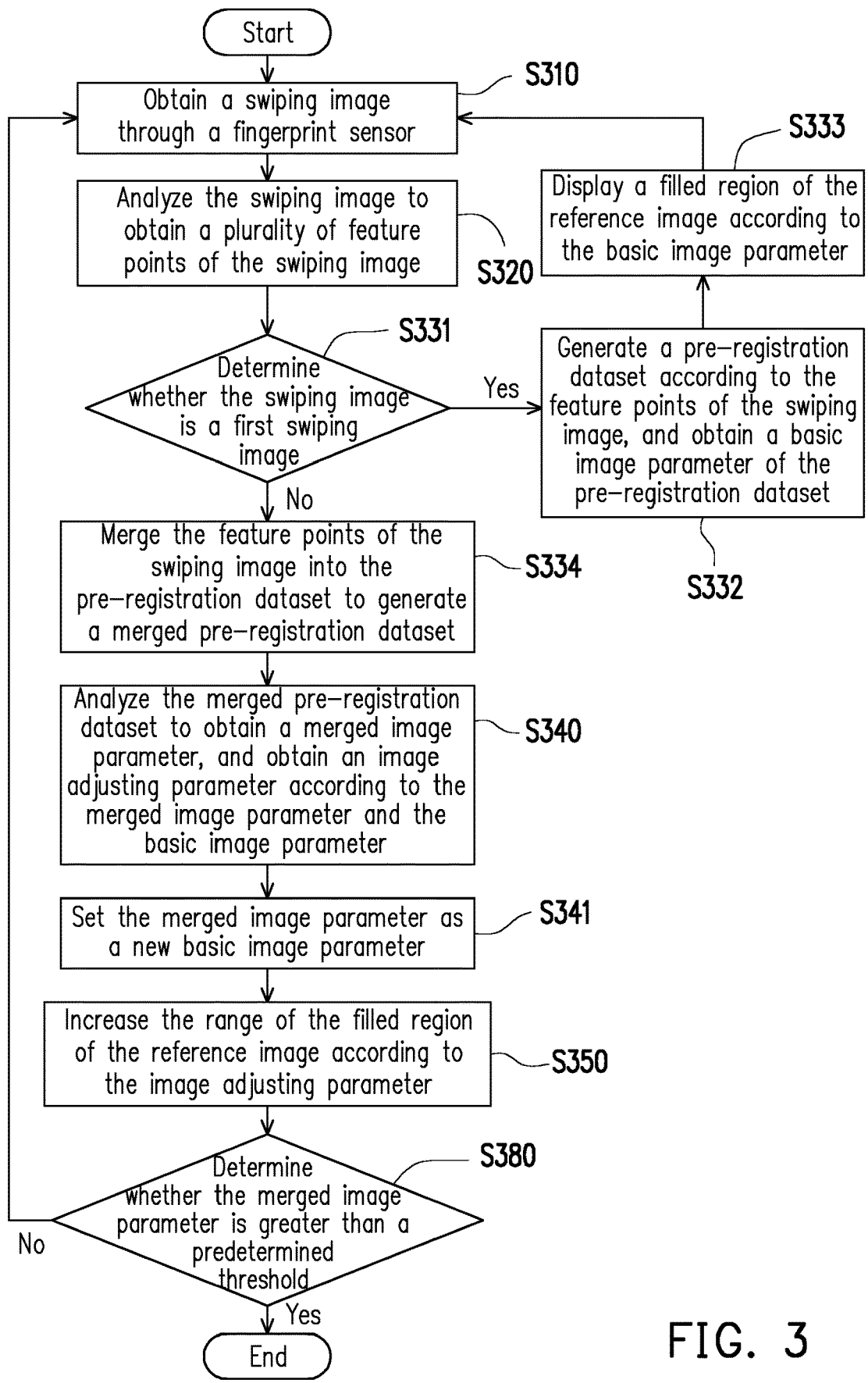
FIG. 3 is a flowchart illustrating a fingerprint registration method according to a first embodiment of the invention.

FIG. 3 is a flowchart illustrating a fingerprint registration method according to a first embodiment of the invention. Referring to FIG. 1 and FIG. 3, the fingerprint registration method of the embodiment is applied to the electronic apparatus 100 of FIG. 1. In step S310, the electronic apparatus 100 senses the object (the user's finger) through the fingerprint sensor 120 to obtain a swiping image. In step S320, the processor 110 analyzes the swiping image to obtain a plurality of feature points of the swiping image. In step S331, the processor 110 determines whether the swiping image is a first swiping image. If yes, the processor 110 executes step S332. In step S332, the processor 110 generates a pre-registration dataset according to the feature points of the swiping image, and obtains a basic image parameter (h) of the pre-registration dataset. In step S333, the processor 110 displays a filled region of the reference image according to the basic image parameter (h). If the swiping image is not the first swiping image, the processor 110 executes step S334. In step S334, the processor 110 merges the feature points of the swiping image into the pre-registration dataset to generate a merged pre-registration dataset.

In step S340, the processor 110 analyzes the merged pre-registration dataset to obtain a merged image parameter (H) and obtain an image adjusting parameter (Step=H−h) according to the merged image parameter (H) and the basic image parameter (h). The image adjusting parameter (Step) is equal to the merged image parameter (H) minus the basic image parameter (h). In step S341, the processor 110 sets the merged image parameter (H) as a new basic image parameter (h). In step 350, the processor 110 increases the range (i.e. length) of the filled region of the reference image according to the image adjusting parameter (Step). In step S380, the processor 110 determines whether the merged image parameter (H) is greater than a predetermined threshold. If yes, it means that sufficient fingerprint registration data is obtained. Then, the processor 110 ends the fingerprint sensing operation of the fingerprint sensor 120, and stores the pre-registration dataset into the memory 130 to be a fingerprint registration dataset, so as to complete the process of fingerprint registration. If not, the processor 110 executes step S310 to obtain a following swiping image.

Figure 4:
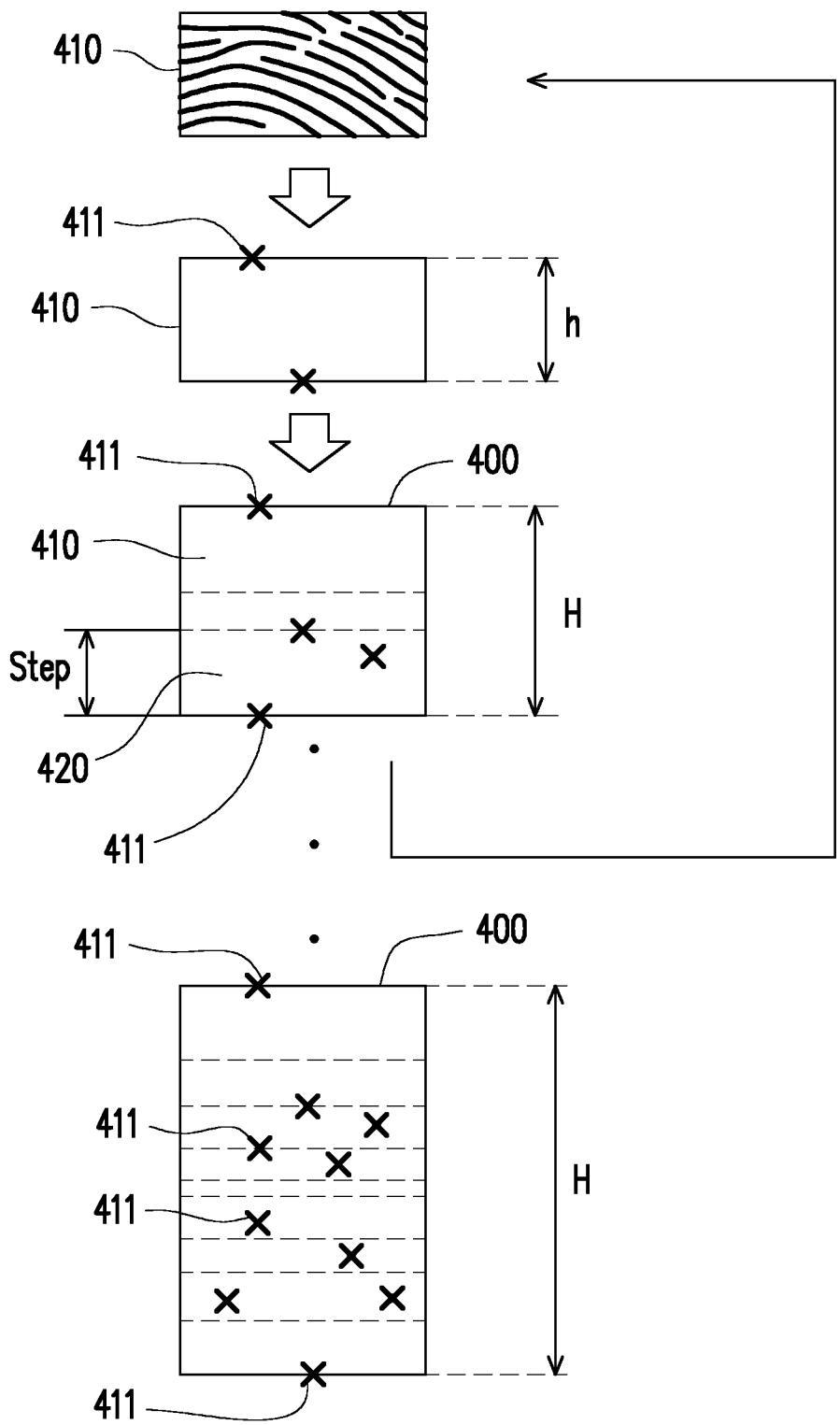
FIG. 4 is a schematic diagram of a pre-registration dataset according to the first embodiment of the invention.

FIG. 4 is a schematic diagram of a pre-registration dataset according to the first embodiment of the invention. FIG. 5A to FIG. 5E are schematic diagrams showing finger swiping operations and their corresponding UI displays according to the first embodiment of the invention. Referring to FIG. 1, FIG. 4 and FIG. 5A to FIG. 5E. The embodiment may be applied to the flowchart of FIG. 3. In the embodiment, after the fingerprint sensor 120 obtains a first swiping image 410 of a finger F, the processor 110 analyzes the first swiping image 410 to obtain a plurality of feature points 411 of the first swiping image 410 and a basic image parameter h. It should be noted that an area of the first swiping image 410 is equal to an area of the sensing surface of the fingerprint sensor 120. In the embodiment, an initial value of the basic image parameter h may be a distance between the two feature points 411 of the first swiping image 410 that are farthest from each other in a length direction, though the invention is not limited thereto. In another embodiment, the initial value of the basic image parameter h may be a length of the first swiping image 410, i.e. a length of the sensing surface of the fingerprint sensor 120. The processor 110 generates the pre-registration dataset according to the feature points 411 of the first swiping image 410. Then, the processor 110 obtains a following swiping image 420 and obtains the feature points of the swiping image 420. In the embodiment, the processor 110 merges the feature points of the swiping image 420 into the pre-registration dataset (i.e. to merge the feature points of the swiping images 410 and 420) to generate a merged pre-registration dataset 400. The processor 110 calculates the merged image parameter H of the merged pre-registration dataset 400. Similarly, the merged image parameter H may be a distance between the two feature points that are farthest from each other in the length direction after the swiping images 410 and 420 are merged, or may be a sum of the length of the two swiping images (i.e. twice the length of the sensing surface of the fingerprint sensor 120) minus a length of an overlapped portion of the swiping images 410 and 420 after the swiping images 410 and 420 are merged. Then, the processor 110 subtracts the basic image parameter h from the merged image parameter H to obtain the image adjusting parameter (Step=H−h).

Namely, each time when the processor 110 merges the feature points of one newly-obtained swiping image into the merged pre-registration dataset 400, the processor 110 calculates the increased length of the merged pre-registration dataset 400, so as to adjust the length of the filled region 511 of the reference image 510 on the UI 500 correspondingly. It should be noted that a width DW of the filled region 511 of the reference image 510 is predetermined and fixed. Each time when the feature points of one additional swiping image is added into the merged pre-registration dataset 400, the processor 110 may correspondingly increase the length of the filled region 511. Moreover, the processor 110 may determine whether the merged image parameter H is greater than the predetermined threshold. If yes, it means that sufficient fingerprint registration data is obtained. For example, when the merged image parameter H is greater than the predetermined threshold, it means that a sufficient amount of fingerprint feature points are obtained or a sufficient amount of swiping images are obtained. Therefore, the processor 110 stores the pre-registration dataset to the memory 130 to serve as the fingerprint registration dataset, so as to complete the fingerprint registration process.

Figure 5A:
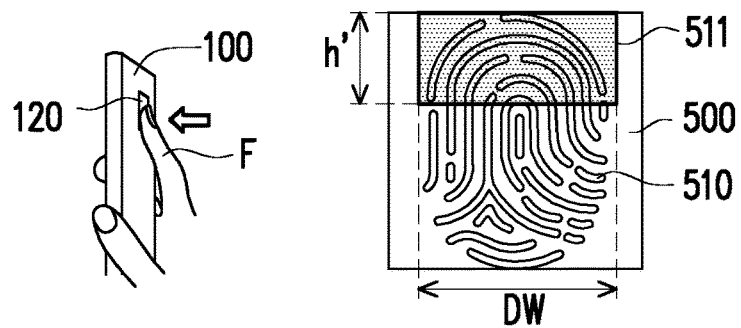
FIG. 5A to FIG. 5E are schematic diagrams showing finger swiping operations and their corresponding UI displays according to the first embodiment of the invention.
Figure 5B:
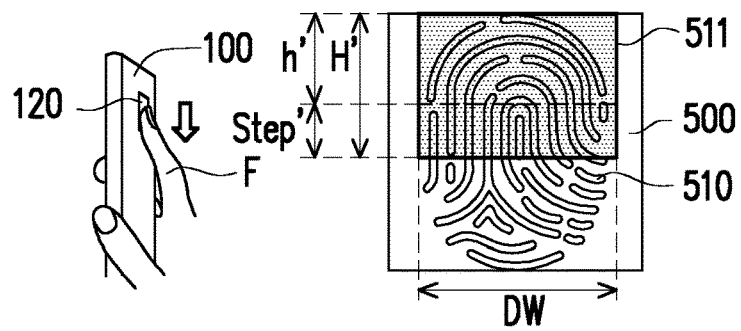
Figure 5C:
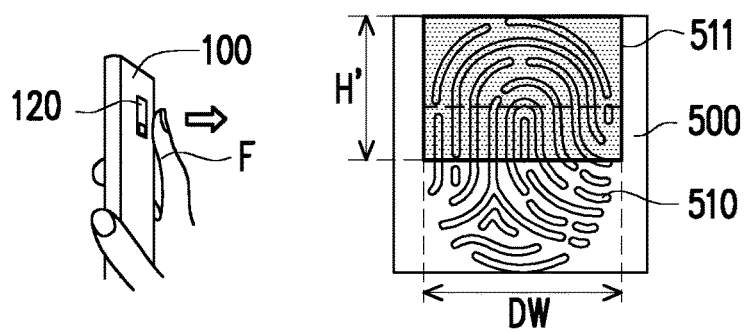
Figure 5D:
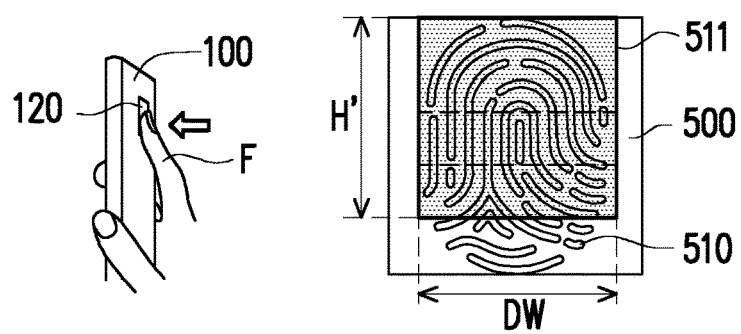
Figure 5E:
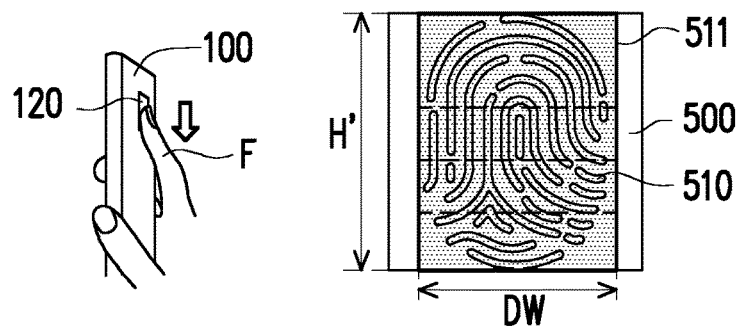

Taking the embodiment shown in FIG. 5A to FIG. 5E as an example. As shown in FIG. 5A, when the user places the finger F on the fingerprint sensor 120 of the electronic apparatus 100 to perform a swiping operation, the electronic apparatus 100 displays the reference image 510 on the UI 500 and obtains the swiping images one-by-one. When the first swiping image is obtained, the electronic apparatus 100 displays the corresponding filled region 511 of the reference image 510, where a length of the filled region 511 corresponds to the basic image parameter h. Moreover, as described above, the width of the filled region 511 is predetermined and fixed. As shown in FIG. 5A, the width of the filled region 511 may be equal to or greater than the width of the reference image 510. As shown in FIG. 5B, when a second swiping image is obtained, the electronic apparatus 100 may increase the length of the filled region 511 of the reference image 510 according to the image adjusting parameter Step. As shown in FIG. 5B, the width of the filled region 511 is fixed. As shown in FIG. 5C, when the finger F of the user leaves the fingerprint sensor 120, the length of the filled region 511 of the reference image 510 stops increasing. However, since the obtained fingerprint information is insufficient, i.e. the merged image parameter H is not greater than the predetermined threshold, the fingerprint registration process is not yet completed and the UI 500 remains displaying the current filled region 511 of the reference image 510 and prompts the user to swipe the finger again. Then, as shown in FIG. 5D, the user again puts the finger F on the fingerprint sensor 120 of the electronic apparatus 100 to perform another swiping operation. The electronic apparatus 100 then obtains a new swiping image, and increases the length of the filled region 511 of the reference image 510 correspondingly. Finally, as shown in FIG. 5E, when the merged image parameter H is greater than the predetermined threshold, the filled region 511 will completely cover the reference image 510. Namely, the length of the filled region 511 is greater than or equal to the length of the reference image 510. Therefore, the fingerprint registration process is completed, and the processor 110 stops the fingerprint sensing operation of the fingerprint sensor 120 and generates the fingerprint registration dataset according to the pre-registration dataset.

Figure 6:
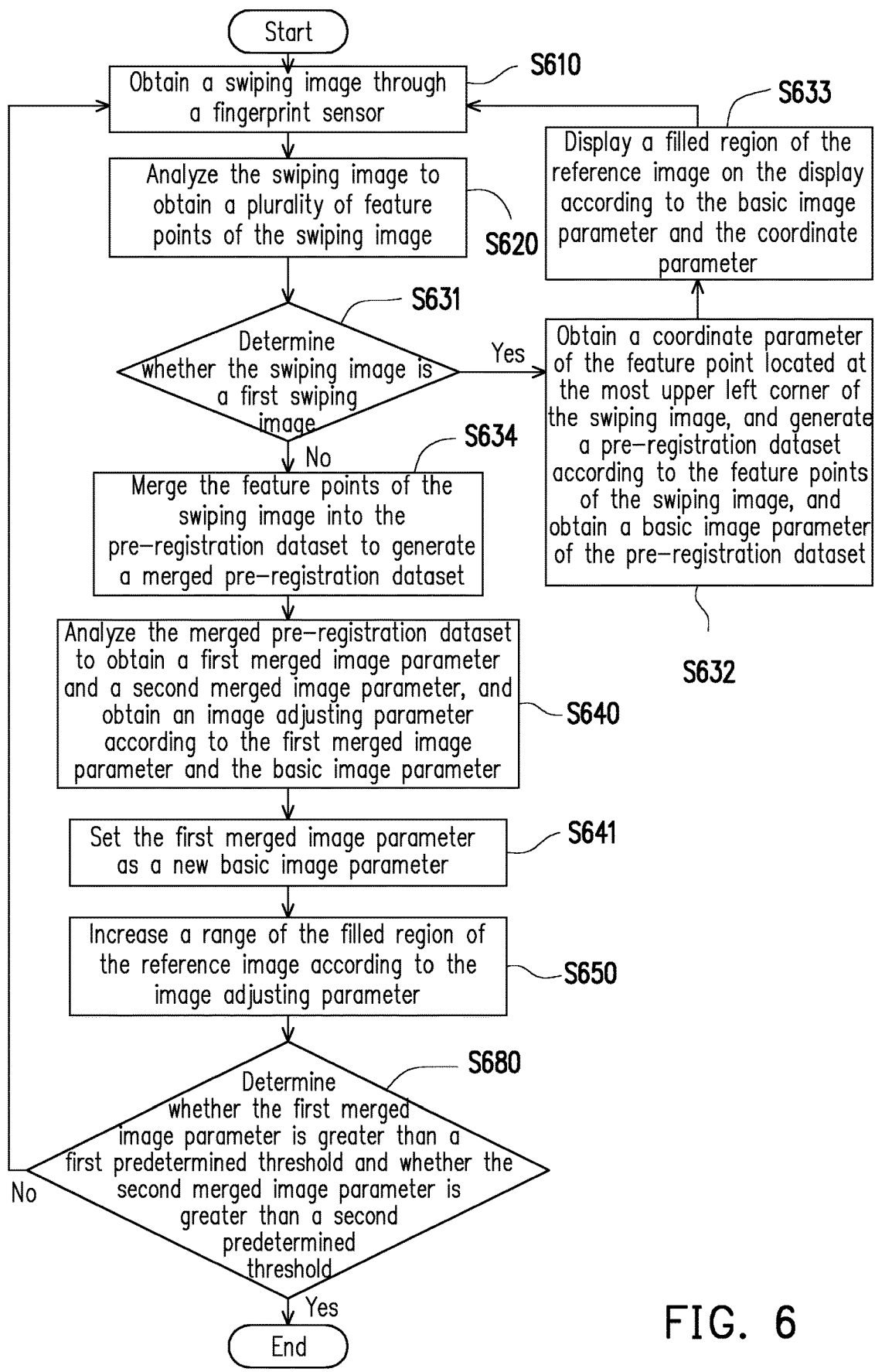
FIG. 6 is a flowchart illustrating a fingerprint registration method according to a second embodiment of the invention.

FIG. 6 is a flowchart illustrating a fingerprint registration method according to a second embodiment of the invention. Referring to FIG. 1 and FIG. 6, the fingerprint registration method of the embodiment is applied to the electronic device 100 of FIG. 1. In step S610, the electronic apparatus 100 senses the object (the user's finger) through the fingerprint sensor 120 to obtain a swiping image. In step S620, the processor 110 analyzes the swiping image to obtain a plurality of feature points of the swiping image. In step S631, the processor 110 determines whether the swiping image is a first swiping image. If yes, the processor 110 executes step S632. In step S632, the processor 110 obtains a coordinate parameter (X, Y) of the feature point located at the most upper left corner of the swiping image, and generates a pre-registration dataset according to the feature points of the swiping image, and obtains a basic image parameter (h) of the pre-registration dataset. In step S633, the processor 110 displays a filled region of the reference image on the display 140 according to the basic image parameter (h) and the coordinate parameter (X, Y). If the swiping image is not the first swiping image, the processor 110 executes step S634. In step S634, the processor 110 merges the feature points of the swiping image into the pre-registration dataset to generate a merged pre-registration dataset.

In step S640, the processor 110 analyzes the merged pre-registration dataset to obtain a first merged image parameter (H) and a second merged image parameter (W), and obtains an image adjusting parameter (Step=H−h) according to the first merged image parameter (H) and the basic image parameter (h). The first merged image parameter (H) may be a distance between two of the merged feature points that are the farthest from each other in a length direction in the pre-registration dataset, or may be a sum of the length of a plurality of swiping images minus a length of an overlapped portion of the swiping images. The second merged image parameter (W) is a distance between two of the merged feature points that are the farthest from each other in a width direction. In step S641, the processor 110 sets the first merged image parameter (H) as a new basic image parameter (h). In step S650, the processor 110 increases a range of the filled region of the reference image according to the image adjusting parameter (Step). In step S680, the processor 110 determines whether the first merged image parameter (H) is greater than a first predetermined threshold and whether the second merged image parameter (W) is greater than a second predetermined threshold. If yes, the processor 110 ends the fingerprint sensing operation of the fingerprint sensor 120 and generates the fingerprint registration dataset according to the merged pre-registration dataset, so as to complete the fingerprint registration. If not, the processor 110 executes step S610 to obtain a following swiping image.

Figure 7:
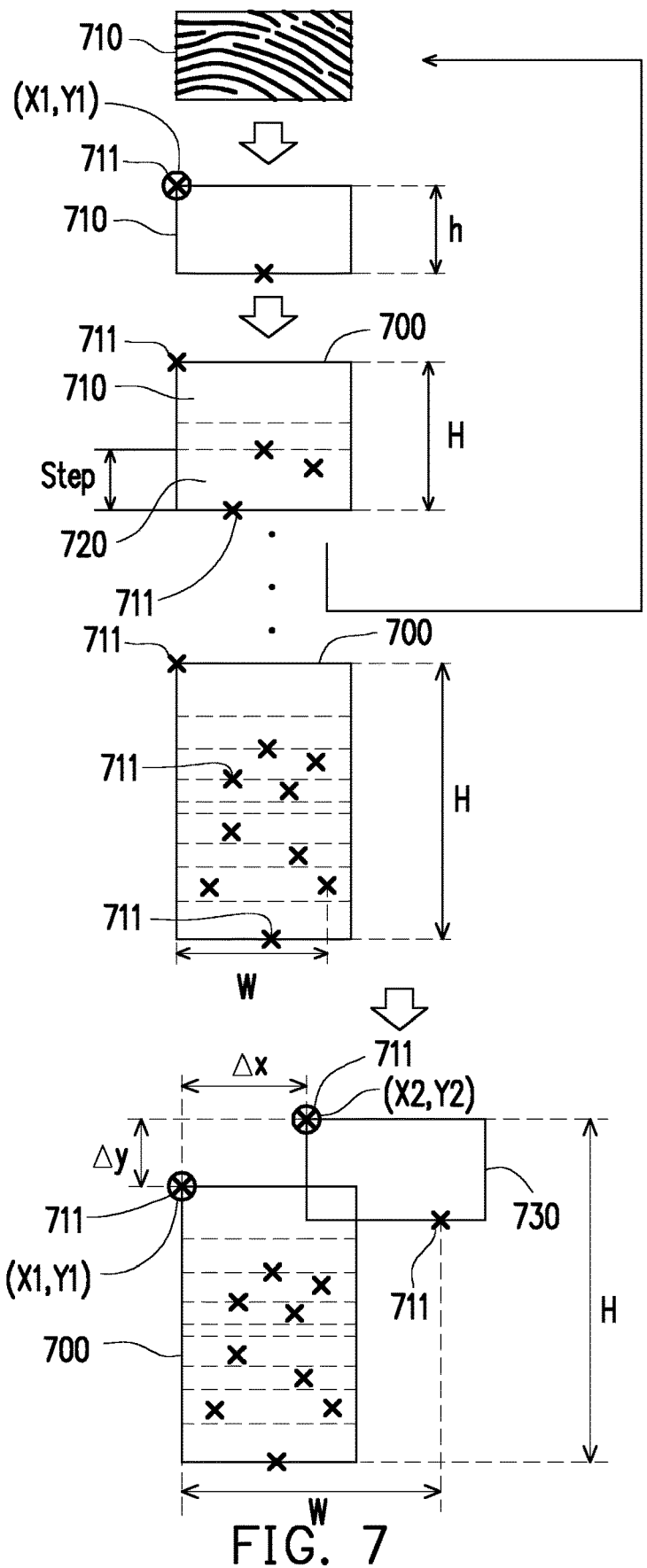
FIG. 7 is a schematic diagram of a pre-registration dataset according to the second embodiment of the invention.

FIG. 7 is a schematic diagram of a pre-registration dataset according to the second embodiment of the invention. FIG. 8A to FIG. 8G are schematic diagrams showing finger swiping operations and their corresponding UI displays according to the second embodiment of the invention. Referring to FIG. 1, FIG. 7 and FIG. 8A to FIG. 8G. The embodiment may be applied to the flowchart of FIG. 6. In the embodiment, after the fingerprint sensor 120 obtains a swiping image 710 of the finger F, the processor 110 analyzes the swiping image 710 to obtain a plurality of feature points 711 of the swiping image 710 and obtain the basic image parameter h and a coordinate parameter (X1, Y1) of the feature point located at the most upper left corner of the swiping image 710. The processor 110 displays a filled region 811 of a reference image 810 according to the coordinate parameter (X1, Y1) and the basic image parameter h. It should be noted that an area of the swiping image 710 is equal to the area of the sensing surface of the fingerprint sensor 120. In the embodiment, the basic image parameter h refers to a distance between two of the feature points 711 of the swiping image 710 that are the farthest from each other in a length direction, but the present invention is not limited thereto. In another embodiment, the basic image parameter h may refer to a length of the swiping image 710, i.e. a length of the sensing surface of the fingerprint sensor 120. The processor 110 generates the pre-registration dataset according to the feature points 711 of the swiping image 710. Then, the processor 110 obtains a following swiping image 720 and obtains the feature points of the swiping image 720. In the embodiment, the processor 110 merges the feature points of the swiping image 720 into the pre-registration dataset (i.e. to merge the feature points of the swiping images 710 and 720) to generate a merged pre-registration dataset 700. The processor 110 calculates a first merged image parameter H (i.e. the maximum image length) and a second merged image parameter W (i.e. the maximum image width) of the merged pre-registration dataset 700. The processor 110 subtracts the basic image parameter h from the first merged image parameter H to obtain the image adjusting parameter Step. Then, the processor 110 increases the length of the filled region 811 of the reference image 810 according to the image adjusting parameter Step.

Namely, each time when the processor 110 merges the feature points of one newly obtained swiping image into the pre-registration dataset 700, the processor 110 calculates an increased length of the merged pre-registration dataset 700, so as to adjust the length of the filled region 811 of the reference image 810 on the UI 800. It should be noted that a width of the filled region 811 of the reference image 810 is predetermined and fixed during one finger swiping operation. Namely, the width of the filled region 811 of the reference image 810 may be increased when another finger swiping operation is performed. During the process of one finger swiping operation, each time when the feature points of one additional swiping image are merged into the pre-registration dataset 700, the processor 110 correspondingly increases the length of the filled region 811 and determines whether the first merged image parameter H and the second merged image parameter W are respectively greater than the first predetermined threshold and the second predetermined threshold. If yes, it means that sufficient fingerprint registration data has been obtained. For example, when the first merged image parameter H is greater than the first predetermined threshold and the second merged image parameter W is greater than the second predetermined threshold, it means that a sufficient number of the fingerprint feature points or the swiping images have been obtained. Therefore, the processor 110 stores the pre-registration dataset to the memory 130 to serve as the fingerprint registration dataset, so as to complete the fingerprint registration.

If the first merged image parameter H is not greater than the first predetermined threshold or the second merged image parameter W is not greater than the second predetermined threshold, the processor 110 displays a prompt on the UI of the display 140 to request the user to swipe the finger again. During a second swiping operation, the processor 110 obtains a first swiping image 730 of the second swiping operation through the fingerprint sensor 120. The processor 110 then obtains the feature points 711 of the first swiping image 730, and merges the feature points 711 into the pre-registration dataset 700. The processor 110 obtains a displacement parameter ($\Delta x$, $\Delta y$) (i.e. X2-X1=$\Delta x$, Y2-Y1=$\Delta y$) according to the coordinate parameter (X1, Y1) of the feature point located at the most upper left corner of the swiping image 710 (i.e. the first swiping image obtained during the first swiping operation) and a coordinate parameter (X2, Y2) of the feature point located at the most upper left corner of the first swiping image 730 obtained during the second swiping operation. According to the displacement parameter ($\Delta x$, $\Delta y$), the processor 110 may increase the width and determine the increased area of the filled region 811 of the reference image 810 on the UI 800 corresponding to the second swiping operation.

In other words, when the second swiping operation is performed, the finger F of the user may shift to the right or left relative to the first swiping operation, and the processor 110 determines an increased width of the filled region 811 corresponding to the second swiping operation according to the coordinate parameter (X2, Y2) of the feature point located at the most upper left corner of the first swiping image 730 obtained during the second swiping operation, i.e. the displacement parameter ($\Delta x$, $\Delta y$), and determines a length of a newly added portion 811b of the filled region 811 corresponding to the second swiping operation according to the basic image parameter h of the first swiping image 730. The processor 110 displays the portion 811b of the filled region 811 corresponding to the second swiping operation according to the coordinate parameter (X2, Y2). Namely, in the second swiping operation, a range of the filled region 811 in a width direction is increased corresponding to the shifting of the finger F of the user. Then, the processor 110 increases the length of the portion 811b of the filled region 811 corresponding to the second swiping operation according to the later obtained swiping images and the corresponding image adjusting parameters Step. Each time when one additional swiping image is obtained, the processor 110 determines whether the first merged image parameter H and the second merged image parameter W are respectively greater than the first and the second predetermined thresholds, so as to determine whether to end the fingerprint registration process.

Figure 8A:
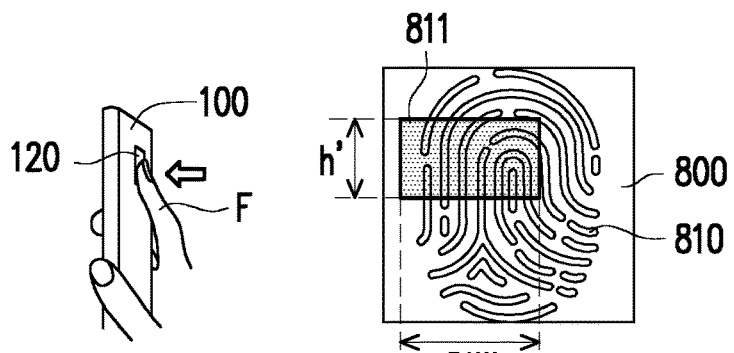
FIG. 8A to FIG. 8G are schematic diagrams showing finger swiping operations and their corresponding UI displays according to the second embodiment of the invention.
Figure 8B:
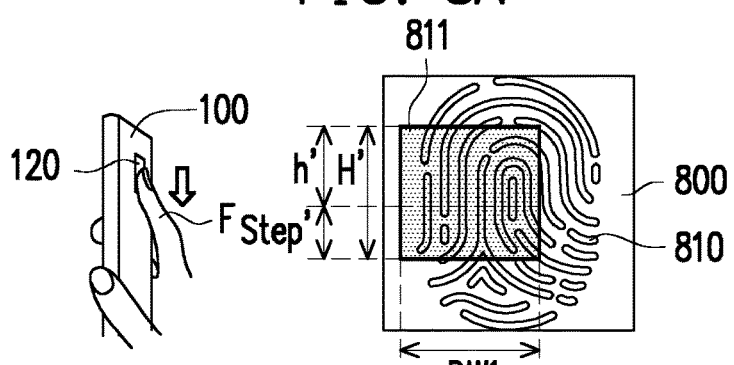
Figure 8C:
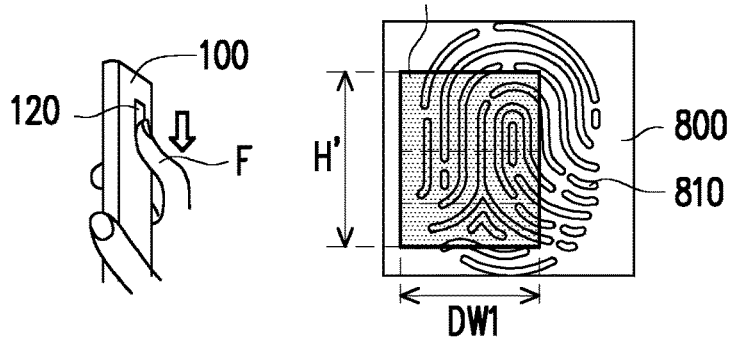
Figure 8D:
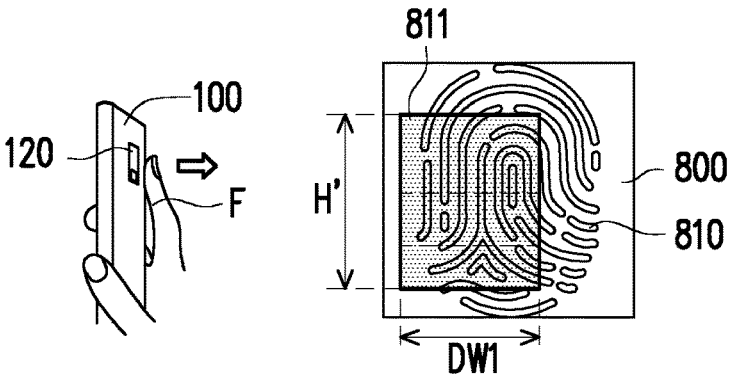
Figure 8E:
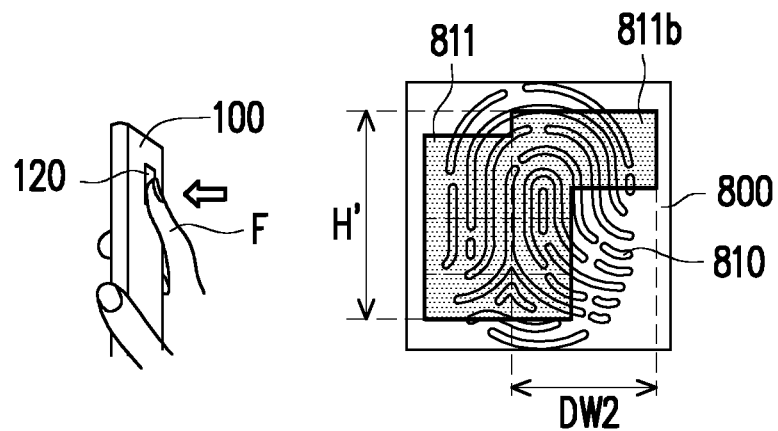
Figure 8F:
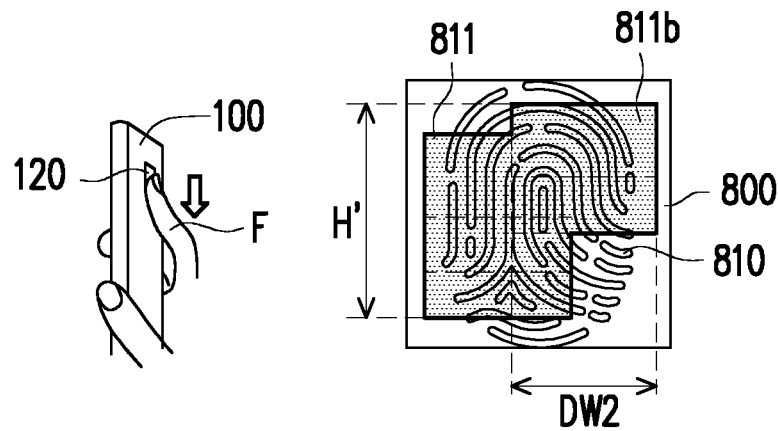
Figure 8G:
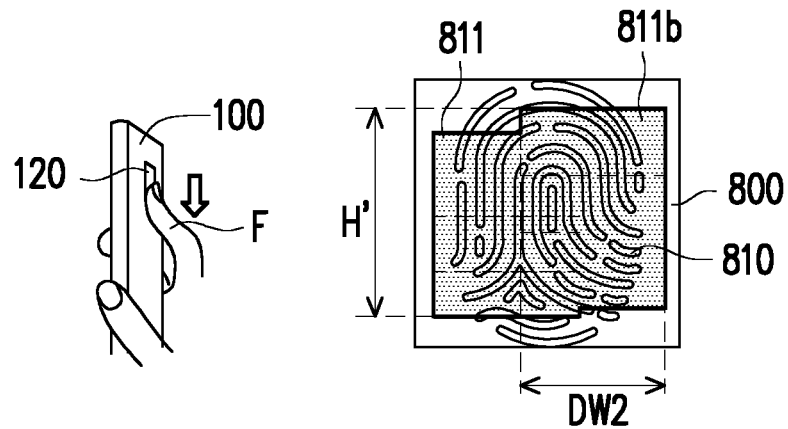

Taking FIG. 8A to FIG. 8G as an example, as shown in FIG. 8A, when the user swipes the finger F on the fingerprint sensor 120 of the electronic apparatus 100 for the first time (i.e. the user performs the first swiping operation), the filled region 811 of the reference image 810 is displayed on the UI 800 corresponding to the first swiping image obtained by the fingerprint sensor 120. As shown in FIG. 8B and FIG. 8C, during the first swiping operation of the finger F, a length of the filled region 811 of the reference image 810 is increased. Specifically, during the first swiping operation of the finger F, the processor 110 increases the length of the filled region 811 of the reference image 810 according to the image adjusting parameter Step. More specifically, during the first swiping operation of the finger F, a width DW1 of the filled region 811 of the reference image 810 is fixed, and a length thereof is increased. As shown in FIG. 8D, when the finger F of the user leaves the fingerprint sensor 120, the length of the filled region 811 of the reference image 810 stops increasing. However, since the fingerprint registration is not yet completed, the UI 800 stays on the current filled region 811 of the reference image 810, and a prompt is displayed to request the user to swipe the finger again. Therefore, as shown in FIG. 8E and FIG. 8F, the user presses the finger F again on the fingerprint sensor 120 of the electronic apparatus 100 to perform the second swiping operation. Compared to the finger's placing position of the first swiping operation, during the second swiping operation, the placing position of the finger is shifted to the upper right. After the first swiping image of the second swiping operation is obtained, the processor 110 calculates the coordinate parameter (X2, Y2) of the feature point located at the most upper left corner of the first swiping image, and subtracts the coordinate parameter (X1, Y1) of the feature point located at the most upper left corner of the first swiping image obtained during the first swiping operation from the coordinate parameter (X2, Y2) to obtain the displacement parameter ($\Delta x$, $\Delta y$) (X2-X1=$\Delta x$, Y2-Y1=$\Delta y$). The processor 110 then displays a newly added portion 811b of the filled region 811 corresponding to the second swiping operation according to the displacement parameter ($\Delta x$, $\Delta y$). As shown in the figures, during the second swiping operation of the finger, the length of the portion 811b of the filled region 811 of the reference image 810 is increased. Specifically, the processor 110 determines the starting position of the newly added portion 811b of the filled region 811 according to the displacement parameter ($\Delta x$, $\Delta y$), and according to the image adjusting parameters Step, increases the length of the portion 811b of the filled region 811 of the reference image 810 corresponding to the second swiping operation. More specifically, during the second swiping operation of the finger F, a width DW2 of the newly added portion 811b of the filled region 811 of the reference image 810 is fixed while the length of the portion 811b is increased. Finally, as shown in FIG. 8G, when the first merged image parameter H and the second merged image parameter W of the pre-registration dataset 700 are respectively greater than the first and the second predetermined thresholds, the filled region 811 substantially covers the reference image 810 and the processor 110 stops the fingerprint sensing operation of the fingerprint sensor 120 so as to complete the fingerprint registration process.

Figure 9:
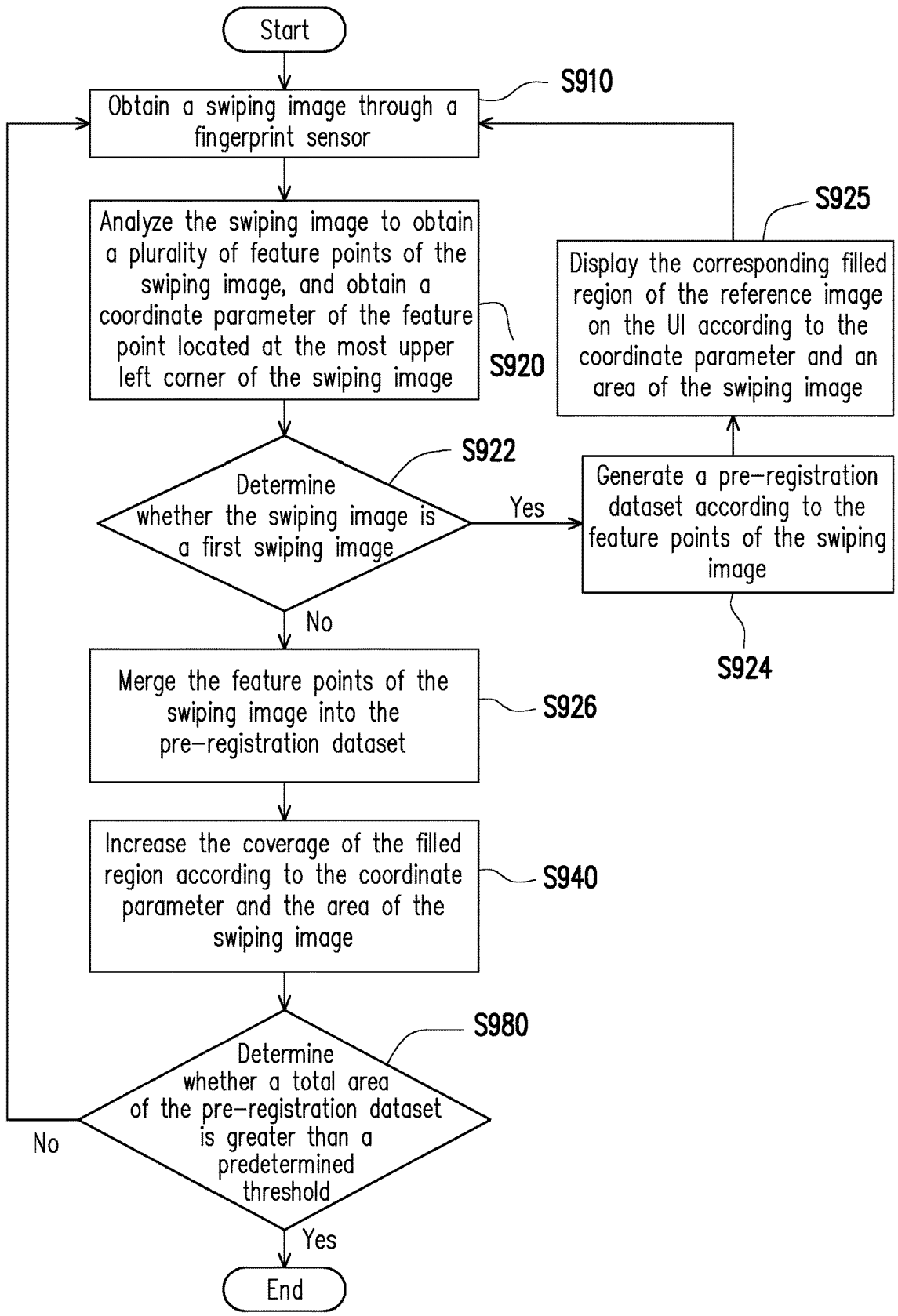
FIG. 9 is a flowchart illustrating a fingerprint registration method according to a third embodiment of the invention.

FIG. 9 is a flowchart illustrating a fingerprint registration method according to a third embodiment of the invention. The fingerprint registration method of the embodiment may be applied to the electronic apparatus 100 of FIG. 1. Referring to FIG. 1 and FIG. 9, in step S910, the electronic apparatus 100 senses the object (the user's finger) through the fingerprint sensor 120 to obtain a swiping image. In step S920, the processor 110 analyzes the swiping image to obtain a plurality of feature points of the swiping image and obtain a coordinate parameter (X, Y) of the feature point located at the most upper left corner of the swiping image. In step S922, the processor 110 determines whether the swiping image is a first swiping image. If yes, the processor 110 executes step S924. In step S924, the processor 110 generates the pre-registration dataset according to the feature points of the swiping image. Then, in step S925, the processor 110 displays the corresponding filled region of the reference image on the UI according to the coordinate parameter (X, Y) and an area of the swiping image. It should be noted that the area of the swiping image is equal to an area of the sensing surface of the fingerprint sensor 120.

If the swiping image is not the first swiping image, the processor 110 executes step S926. In step S926, the processor 110 merges the feature points of the swiping image into the pre-registration dataset. In step S940, the processor 110 increases the coverage of the filled region according to the coordinate parameter (X, Y) and the area of the swiping image. In step S980, the processor 110 determines whether a total area of the pre-registration dataset is greater than a predetermined threshold. The total area of the pre-registration dataset may be a sum of the area of all of the swiping images whose feature points are merged into the pre-registration dataset minus a sum of the area of the overlapped regions of the swiping images, or the number of the feature points included in the pre-registration dataset. In other words, in step S980, the processor 110 determines whether the number of the feature points included in the pre-registration dataset is greater than a predetermined threshold. If yes, the processor 110 ends the fingerprint sensing operation of the fingerprint sensor 120 and generates a fingerprint registration dataset according to the merged pre-registration dataset, so as to complete the fingerprint registration. If not, the processor 110 executes step S910 to obtain a following swiping image.

Figure 10:
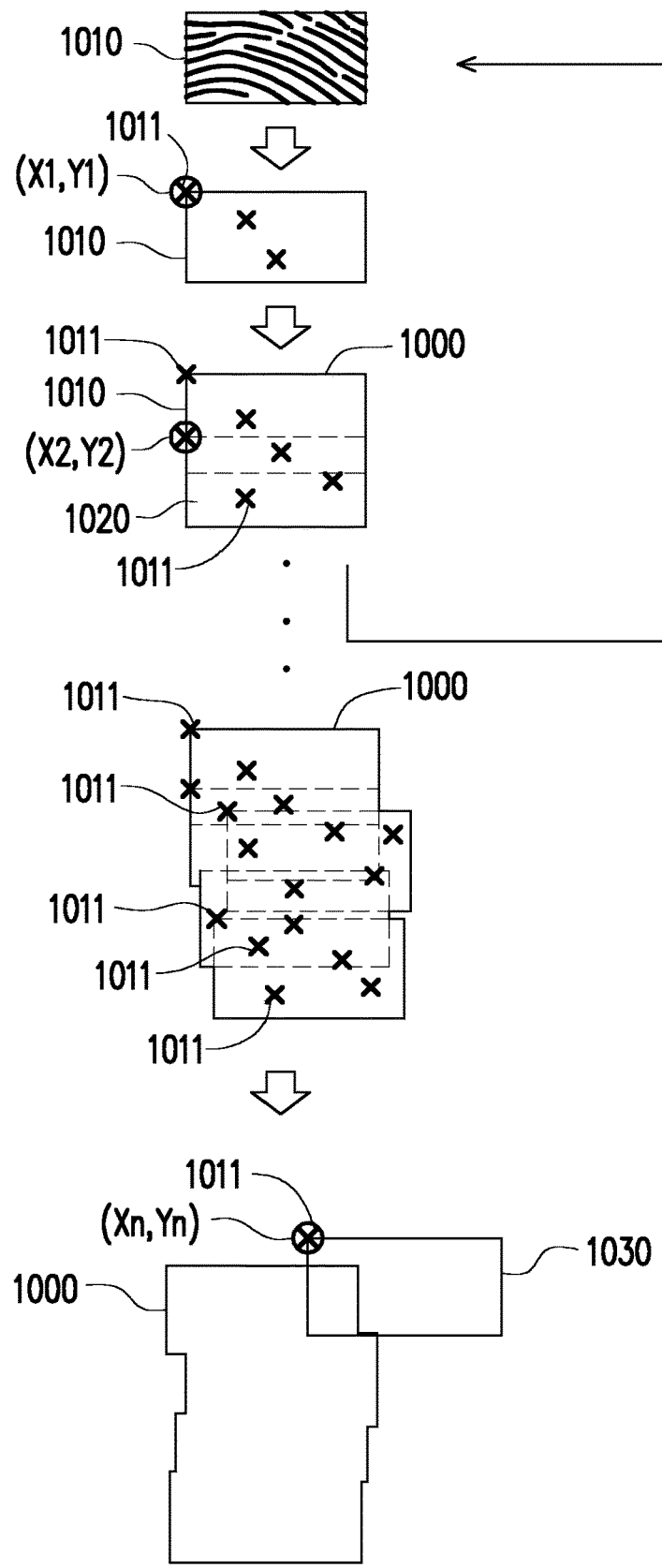
FIG. 10 is a schematic diagram of a pre-registration dataset according to the third embodiment of the invention.
Figure 11A:
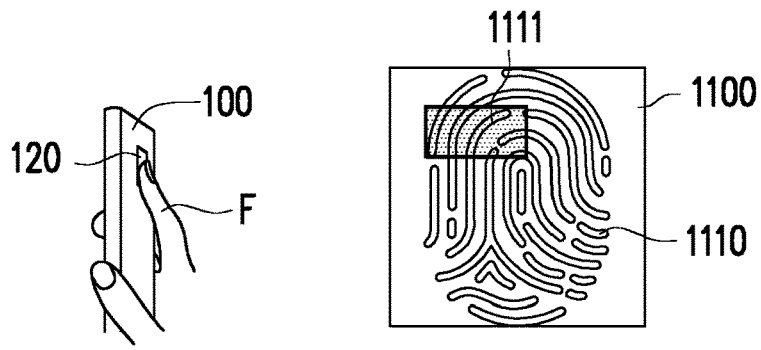
FIG. 11A to FIG. 11I are schematic diagrams showing finger swiping operations and their corresponding UI displays according to the third embodiment of the invention.

FIG. 10 is a schematic diagram of a pre-registration dataset according to the third embodiment of the invention. FIG. 11A to FIG. 11I are schematic diagrams showing finger swiping operations and their corresponding UI displays according to the third embodiment of the invention. The embodiment may be applied to the flowchart of FIG. 9. Referring to FIG. 1, FIG. 10 and FIG. 11A to FIG. 11I, in the embodiment, after the fingerprint sensor 120 obtains a swiping image 1010 of the finger F, the processor 110 analyzes the swiping image 1010 to obtain a plurality of feature points 1011 of the swiping image 1010 and obtain the coordinate parameter (X1, Y1) of the feature point 1011 located at the most upper left corner of the swiping image 1010. As shown in FIG. 11A, the processor 110 displays the filled region 1111 of the reference image 1110 on the UI 1100 according to the coordinate parameter (X1, Y1) and the area of the swiping image 1010 (i.e. the area of the sensing surface of the fingerprint sensor 120). Moreover, the processor 110 generates a pre-registration dataset according to the feature points of the swiping image 1010.

Figure 11B:
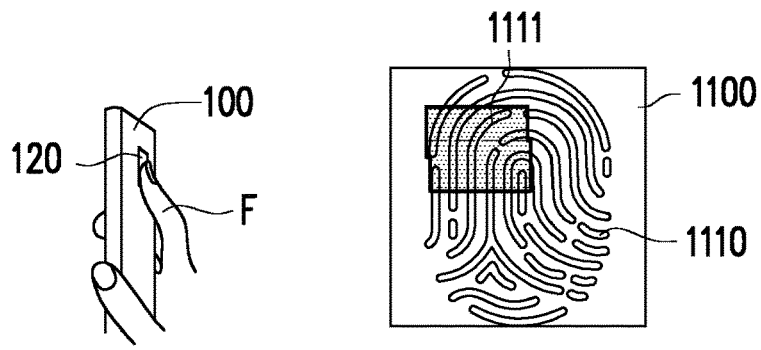

Then, the processor 110 obtains and analyzes a following swiping image 1020 to obtain a plurality of feature points 1011 of the swiping image 1020. In the embodiment, the processor 110 compares the feature points of the swiping images 1010 and 1020 to find the feature points simultaneously included in the swiping images 1010 and 1020, so as to obtain a relative position relationship of the swiping images 1010 and 1020. The processor 110 also obtains a coordinate parameter (X2, Y2) of the feature point located at the most upper left corner of the swiping image 1020. As shown in FIG. 11B, the processor 110 may increase the coverage of the filled region 1111 of the reference image 1110 according to the coordinate parameter (X2, Y2) and the area of the swiping image 1020. Moreover, the processor 110 merges the feature points of the swiping image 1020 into the pre-registration dataset to generate a merged pre-registration dataset.

Namely, each time when the processor 110 obtains one additional swiping image, the processor 110 merges the feature points thereof into the pre-registration data. Moreover, the processor 110 obtains the coordinate parameter of the feature point located at the most upper left corner of the swiping image to determine the increased range and position of the filled region 1111 of the reference image 1110 on the UI 1100. It should be noted that the processor 110 determines whether to end the fingerprint registration process by determining whether the total area of the pre-registration data is greater than a predetermine threshold. If the total area of the pre-registration data is not greater than the predetermined threshold, the processor 110 senses and obtains a following swiping image. As shown in FIG. 10 and FIG. 11E to FIG. 11F, in the process of fingerprint registration, after the first swiping operation of the user's finger, the user's finger may leave the fingerprint sensor 120. If the obtained fingerprint data is still insufficient, namely, the total area of the pre-registration data is not greater than the predetermined threshold, the processor 110 may display a prompt on the UI through the display 140 to request the user to swipe the finger again. During the second swiping operation, the processor 110 obtains a first swiping image 1030 of the second swiping operation, and the processor 110 obtains the feature points of the swiping image 1030, and merges the feature points to the pre-registration dataset. The processor 110 obtains a coordinate parameter (Xn, Yn) of the feature point located at the most upper left corner of the swiping image 1030, and increases the range of the filled region 1111 of the reference image 1110 on the UI 1100 according to the coordinate parameter (Xn, Yn) and the area of the swiping image 1030.

It should be noted that by comparing and analyzing the pre-registration dataset and the feature points of the swiping image 1030, the processor 110 may obtain a relative position relationship between the swiping image 1030 and the previously obtained swiping images and accordingly obtain the coordinate parameter (Xn, Yn). In other words, the processor 110 displays the filled region 1111 of the reference image 1110 according to the relative position relationship of the swiping image 1030 and the previously obtained swiping images. Moreover, the processor 110 may determine whether the total area of the pre-registration dataset is greater than the predetermined threshold to determine whether to end the fingerprint registration process.

Figure 11C:
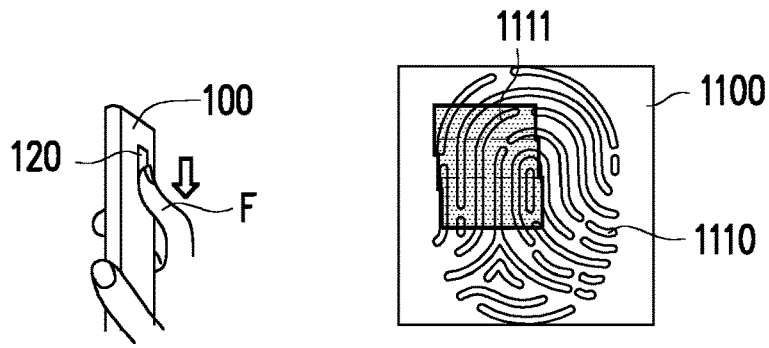
Figure 11D:
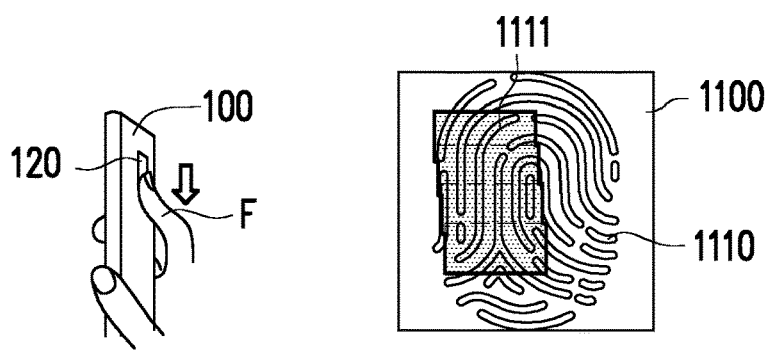
Figure 11E:
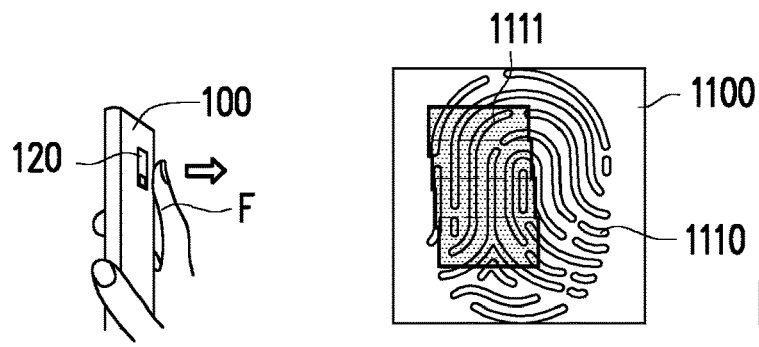
Figure 11F:
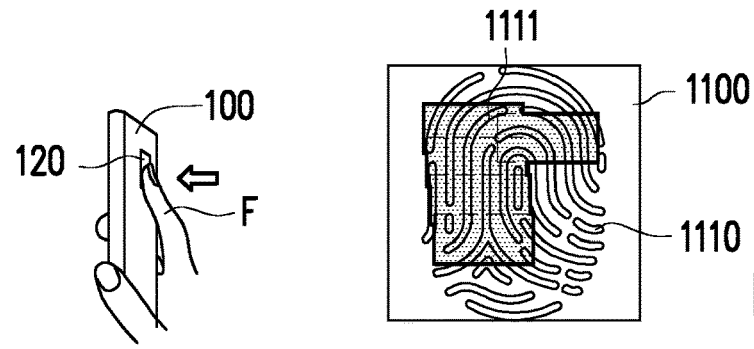
Figure 11G:
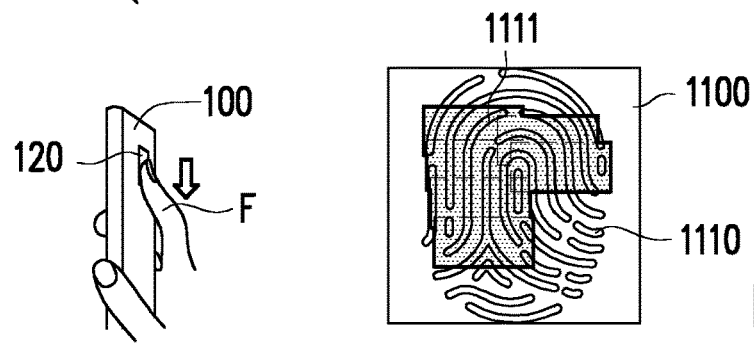
Figure 11H:
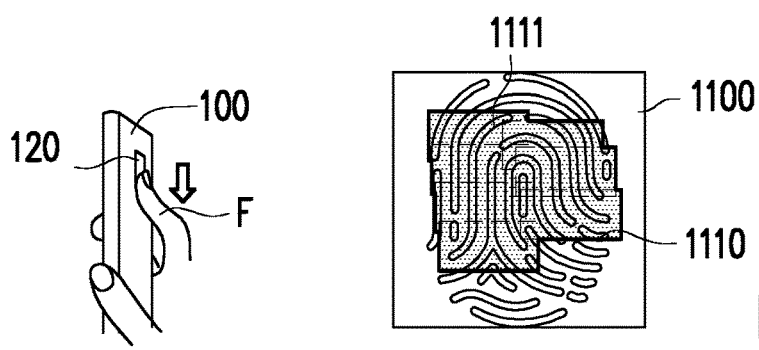
Figure 11I:
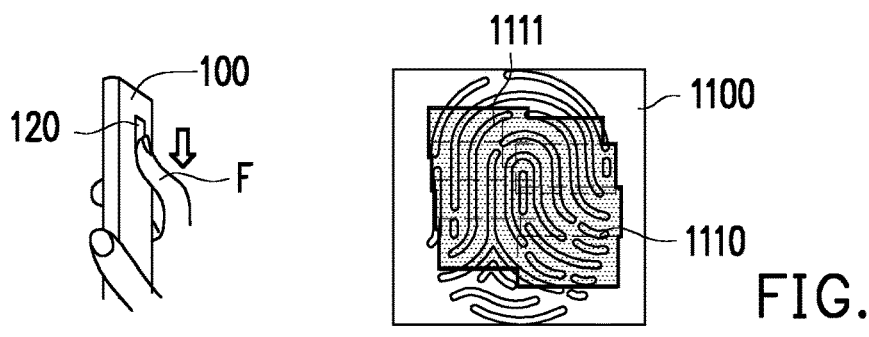

For example, taking FIG. 11A to FIG. 11I as an example, as shown in FIG. 11A, when the user places the finger F on the fingerprint sensor 120 of the electronic apparatus 100 to perform a swiping operation, the filled region 1111 of the reference image 1110 on the UI 1100 is displayed correspondingly according to the swiping images obtained by the fingerprint sensor 120. As shown in FIG. 11B to FIG. 11D, during the swiping operation of the finger F, the range of the filled region 1111 of the reference image 1110 is correspondingly adjusted according to the progress of the swiping operation (i.e. the number of the obtained swiping images). As shown in FIG. 11E, when the finger F of the user leaves the fingerprint sensor 120, the range of the filled region 1111 of the reference image 1110 stops increasing. However, since the fingerprint registration process is not yet completed, the UI 1100 stays on the current filled region 1111 of the reference image 1110 and the user is requested to swipe the finger again. As shown in FIG. 11F to 11H, the user again places the finger F on the fingerprint sensor 120 of the electronic apparatus 100 to perform another swiping operation. The range of the filled region 1111 of the reference image 1110 is continually increased corresponding to the progress of the swiping operation. As shown in FIG. 11I, when the total area of the pre-registration dataset is greater than the predetermined threshold, the processor 110 determines that sufficient fingerprint data has been obtained, and the range of the filled region 1111 of the reference image 1110 is increased to a sufficient area to cover the reference image 1110 substantially. Therefore, the processor 110 stops the fingerprint sensing operation of the fingerprint sensor 120, and generates the fingerprint registration dataset according to the pre-registration dataset so as to complete the fingerprint registration process.

In summary, the display method of user interface and the electronic apparatus using the display method are applied to collect a plurality of swiping images obtained when the user's finger performs one or more swiping operations on the fingerprint sensor. The feature points of the swiping images are merged to generate the fingerprint registration data. When the feature points of the swiping images are merged, the electronic apparatus of the invention analyzes the repeatedness and relative position relationship of the feature points of the swiping images so as to obtain the corresponding image parameters and/or coordinate parameters. Therefore, the display method of user interface and the electronic apparatus using the display method may correspondingly display the filled region of the reference image on the UI of the display according to the image parameters and/or the coordinate parameters, so as to dynamically adjust the range of the filled region of the reference image on the UI. Namely, during the finger swiping operation performed for fingerprint registration, the user may learn a progress of the fingerprint registration through the range change of the filled region of the reference image on the UI displayed on the display of the electronic apparatus. Accordingly, during the process of fingerprint registration, the display method of user interface and the electronic apparatus using the display method of the invention may provide real-time fingerprint registration progress information to the user, so as to provide more efficient and convenient fingerprint registration experiences.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A display method of user interface, applied to fingerprint registration, the display method of user interface comprising:
    obtaining a plurality of swiping images by a fingerprint sensor;
    analyzing the plurality of swiping images to obtain a plurality of feature points of the plurality of the swiping images;
    merging the plurality of feature points of the plurality of swiping images into a pre-registration dataset by the processor;
    displaying a filled region of a reference image on a user interface according to the plurality of swiping images by the processor; and
    analyzing the pre-registration dataset to determine whether to end the fingerprint registration by the processor,
    for each of the plurality of the swiping images, further comprising:
    analyzing the pre-registration dataset to obtain an image adjusting parameter by the processor; and
    updating a range of the filled region of the reference image according to the image adjusting parameter for increasing a length of the filled region by the processor.

2. The display method of user interface as claimed in claim 1, for each of the plurality of the swiping images, further comprising:
    determining whether the swiping image is a first swiping image by the processor;
    if the swiping image being the first swiping image, generating the pre-registration dataset according to the feature points of the swiping image, and analyzing the pre-registration dataset to obtain a basic image parameter by the processor; and
    displaying the filled region of the reference image on the user interface of the display according to the basic image parameter by the display.

3. The display method of user interface as claimed in claim 2, for each of the plurality of the swiping images, further comprising:
    if the swiping image being not the first swiping image, merging the feature points of the swiping image into the pre-registration dataset to generate a merged pre-registration dataset by the processor;
    analyzing the merged pre-registration dataset to obtain a merged image parameter, and obtaining an image adjusting parameter according to the merged image parameter and the basic image parameter by the processor;
    setting the merged image parameter as a new basic image parameter by the processor; and
    adjusting the filled region of the reference image according to the image adjusting parameter by the processor.

4. The display method of user interface as claimed in claim 3, for each of the plurality of the swiping images, further comprising:
    determining whether the merged image parameter is greater than a predetermined threshold to determine whether to end the fingerprint registration by the processor.

5. The display method of user interface as claimed in claim 2, for each of the plurality of the swiping images, further comprising:

determining whether the swiping image is the first swiping image by the processor;
if the swiping image being the first swiping image, analyzing the swiping image to obtain a coordinate parameter of the feature point located at the most upper left corner of the swiping image by the processor; and
determining a position of the filled region of the reference image according to the coordinate parameter of the feature point located at the most upper left corner of the swiping image by the processor.

6. The display method of user interface as claimed in claim 5, for each of the plurality of the swiping images, further comprising:
if the swiping image being not the first swiping image, merging the feature points of the swiping image into the pre-registration dataset to generate a merged pre-registration dataset;
analyzing the merged pre-registration dataset to obtain a first merged image parameter and a second merged image parameter, and obtaining the image adjusting parameter according to the first merged image parameter and the basic image parameter, wherein the first merged image parameter represents a range the merged pre-registration dataset covers in a vertical direction, and the second merged image parameter represents a range the merged pre-registration dataset covers in a horizontal direction;
setting the first merged image parameter as a new basic image parameter; and
increasing the range of the filled region of the reference image in the vertical direction according to the image adjusting parameter.

7. The display method of user interface as claimed in claim 6, for each of the plurality of the swiping images, further comprising:
determining whether the first merged image parameter is greater than a first predetermined threshold, and determining whether the second merged image parameter is greater than a second predetermined threshold, so as to determine whether to end the fingerprint registration.

8. A display method of user interface, applied to fingerprint registration, the display method of user interface comprising:
obtaining a plurality of swiping images by a fingerprint sensor;
analyzing the plurality of swiping images to obtain a plurality of feature points of the plurality of the swiping images;
merging the plurality of feature points of the plurality of swiping images into a pre-registration dataset by the processor;
displaying a filled region of a reference image on a user interface according to the plurality of swiping images by the processor; and
analyzing the pre-registration dataset to determine whether to end the fingerprint registration by the processor,
for each of the plurality of the swiping images, further comprising:
analyzing the pre-registration dataset to obtain a corresponding coordinate parameter by the processor; and
updating a range of the filled region of the reference image according to the coordinate parameter and an area of the swiping image by the processor.

9. The display method of user interface as claimed in claim 8, for each of the plurality of the swiping images, further comprising:

determining whether the swiping image is a first swiping image by the processor;
if the swiping image being the first swiping image, generating the pre-registration dataset according to the feature points of the swiping image by the processor; and
if the swiping image being not the first swiping image, merging the feature points of the swiping image into the pre-registration dataset to generate a merged pre-registration dataset by the processor.

10. The display method of user interface as claimed in claim 9, for each of the plurality of the swiping images, further comprising:
determining whether a total area of the merged pre-registration dataset is greater than a predetermined threshold, so as to determine whether to end the fingerprint registration.

11. An electronic apparatus, comprising:
a fingerprint sensor, configured to obtain a plurality of swiping images;
a processor, coupled to the fingerprint sensor, configured to analyze the plurality of swiping images to obtain a plurality of feature points of the plurality of swiping images and merge the plurality of feature points of the plurality of swiping images into a pre-registration dataset; and
a display, coupled to the processor, configured to display a user interface;
wherein the processor displays a filled region of a reference image on the user interface according to the plurality of swiping images, and the processor analyzes the pre-registration dataset to determine whether to end the fingerprint registration,
for each of the plurality of the swiping images, wherein
the processor analyzes the pre-registration dataset to obtain an image adjusting parameter, and
the processor updates a range of the filled region of the reference image according to the image adjusting parameter for increasing a length of the filled region.

12. The electronic apparatus as claimed in claim 1, for each of the plurality of the swiping images, wherein
the processor determines whether the swiping image is a first swiping image, if the processor determines that the swiping image is the first swiping image, the processor generates the pre-registration dataset according to the feature points of the swiping image, and analyzes the pre-registration dataset to obtain a basic image parameter, and
the display displays the filled region of the reference image on the user interface of the display according to the basic image parameter.

13. The electronic apparatus as claimed in claim 12, for each of the plurality of the swiping images, wherein
if the processor determines that the swiping image is not the first swiping image, the processor merges the feature points of the swiping image into the pre-registration dataset to generate a merged pre-registration dataset, and
the processor analyzes the merged pre-registration dataset to obtain a merged image parameter, and the processor obtains an image adjusting parameter according to the merged image parameter and the basic image parameter, and
the processor sets the merged image parameter as a new basic image parameter, and the processor adjusts a range of the filled region of the reference image according to the image adjusting parameter.

14. The electronic apparatus as claimed in claim 13, for each of the plurality of the swiping images, wherein the processor determines whether the merged image parameter is greater than a predetermined threshold, so as to determine whether to end the fingerprint registration.

15. The electronic apparatus as claimed in claim 12, for each of the plurality of the swiping images, wherein the processor determines whether the swiping image is the first swiping image, if the processor determines that the swiping image is the first swiping image, the processor analyzes the swiping image to obtain a coordinate parameter of the feature point located at the most upper left corner of the swiping image, and the processor determines a position of the filled region of the reference image according to the coordinate parameter of the feature point located at the most upper left corner of the swiping image.

16. The electronic apparatus as claimed in claim 15, for each of the plurality of the swiping images, wherein if the swiping image is not the first swiping image, the processor merges the feature points of the swiping image into the pre-registration dataset to generate a merged pre-registration dataset, the processor analyzes the merged pre-registration dataset to obtain a first merged image parameter and a second merged image parameter, and the processor obtains the image adjusting parameter according to the first merged image parameter and the basic image parameter, wherein the first merged image parameter represents a range the merged pre-registration dataset covers in a vertical direction, and the second merged image parameter represents a range the merged pre-registration dataset covers in a horizontal direction, and the processor sets the first merged image parameter as a new basic image parameter, and the processor adjusts a range of the filled region of the reference image in the vertical direction according to the image adjusting parameter.

17. The electronic apparatus as claimed in claim 16, for each of the plurality of the swiping images, wherein the processor determines whether the first merged image parameter is greater than a first predetermined threshold and whether the second merged image parameter is greater than a second predetermined threshold, so as to determine whether to end the fingerprint registration.

18. An electronic apparatus, comprising:

a fingerprint sensor, configured to obtain a plurality of swiping images;

a processor, coupled to the fingerprint sensor, configured to analyze the plurality of swiping images to obtain a plurality of feature points of the plurality of swiping images merge the plurality of feature points of the plurality of swiping images into a pre-registration dataset; and a display, coupled to the processor, configured to display a user interface;

wherein the processor displays a filled region of a reference image on the user interface according to the plurality of swiping images, and the processor analyzes the pre-registration dataset to determine whether to end the fingerprint registration, for each of the plurality of the swiping images, wherein the processor analyzes the pre-registration dataset to obtain a corresponding coordinate parameter, and the processor updates a range of the filled region of the reference image according to the coordinate parameter and an area of the swiping image.

19. The electronic apparatus as claimed in claim 18, for each of the plurality of the swiping images, wherein the processor determines whether the swiping image is a first swiping image, if the processor determines that the swiping image is the first swiping image, the processor generates the pre-registration dataset according to the feature points of the swiping image, and if the processor determines that the swiping image is not the first swiping image, the processor merges the feature points of the swiping image into the pre-registration dataset to generate a merged pre-registration dataset.

20. The electronic apparatus as claimed in claim 19, for each of the plurality of the swiping images, wherein the processor determines whether a total area of the merged pre-registration dataset is greater than a predetermined threshold, so as to determine whether to end the fingerprint registration.

* * * * *